US005544254A

United States Patent [19]

Hartley et al.

[11] Patent Number: 5,544,254

[45] Date of Patent: Aug. 6, 1996

[54] CLASSIFYING AND SORTING CRYSTALLINE OBJECTS

[75] Inventors: Richard I. Hartley; Julia A. Noble, both of Schenectady; James C. M. Grande, Ballston Lake, all of N.Y.; William E. Jackson, Dublin, Ohio; Kenneth B. Welles, II, Scotia; Jane S. Liu, Latham, both of N.Y.

[73] Assignee: General Electric Company, Worthington, Ohio

[21] Appl. No.: 400,556

[22] Filed: Mar. 8, 1995

Related U.S. Application Data

[63] Continuation of Ser. No. 17,208, Feb. 12, 1993, abandoned.

[51] Int. Cl.[6] .............................. G06K 9/00; G06K 9/52; G06K 9/62

[52] U.S. Cl. .......................... 382/108; 382/152; 382/206; 382/215; 382/227; 356/30

[58] Field of Search ............................ 382/209, 215–219, 382/141, 152, 224, 227, 201, 203, 204, 206, 100, 108; 209/576, 577, 579, 588, 594; 356/30

[56] References Cited

U.S. PATENT DOCUMENTS

| | | | |
|---|---|---|---|
| Re. 32,380 | 3/1987 | Wentorf et al. | 407/119 |
| 2,941,248 | 6/1960 | Hall | 18/16.5 |
| 2,947,609 | 8/1960 | Strong | 23/209.1 |
| 2,947,610 | 8/1960 | Hall et al. | 23/209.1 |
| 2,947,617 | 8/1960 | Wentorf, Jr. | 51/307 |
| 3,136,615 | 6/1964 | Boverkerk et al. | 51/307 |
| 3,212,852 | 10/1965 | Bundy | 23/191 |
| 3,233,988 | 2/1966 | Wentorf et al. | 51/307 |
| 3,743,489 | 7/1973 | Wentorf, Jr. et al. | 51/307 |
| 3,767,371 | 10/1973 | Wentorf, Jr. et al. | 51/307 |
| 3,852,078 | 12/1974 | Wakatsuki et al. | 106/43 |
| 3,925,868 | 12/1975 | Singh | 29/96 |
| 4,016,244 | 4/1977 | Susa et al. | 423/290 |
| 4,125,770 | 11/1978 | Lang | 356/30 |
| 4,188,194 | 2/1980 | Corrigan | 51/307 |
| 4,224,380 | 9/1980 | Bovenkerk et al. | 428/545 |
| 4,228,248 | 10/1980 | Zimmerman | 521/115 |
| 4,624,367 | 11/1986 | Shafer et al. | 382/25 |
| 4,727,778 | 3/1988 | Omi | 76/112 |
| 4,765,484 | 8/1988 | Klumparendt | 209/577 |
| 4,783,829 | 11/1988 | Miyakawa et al. | 382/30 |
| 4,906,940 | 3/1990 | Greene et al. | 382/22 |
| 5,124,935 | 6/1992 | Wallner et al. | 356/30 |
| 5,184,732 | 2/1993 | Ditchburn et al. | 209/576 |
| 5,193,685 | 3/1993 | Trevithick | 209/589 |

FOREIGN PATENT DOCUMENTS

| | | | |
|---|---|---|---|
| 0054291 | 6/1982 | European Pat. Off. | B23C 5/22 |
| 0183902 | 5/1985 | European Pat. Off. | B23D 65/100 |
| 2263991 | 3/1975 | France | C04B 35/56 |
| 49-022925 | 6/1974 | Japan . | |
| 49-027518 | 7/1974 | Japan | B24D 3/00 |
| 49-030357 | 12/1974 | Japan | B24D 103/16 |
| 58-120460 | 1/1982 | Japan | B23B 27/14 |
| 61-111801 | 5/1986 | Japan | B23B 27/16 |
| 01109034 | 10/1987 | Japan | B23P 15/28 |

OTHER PUBLICATIONS

Proceedings of the Fourth International Conference of High Pressure, Icinose et al., "Synthesis of Polycrystalline Cubic BN (V)".

Proceedings of the Fourth International Conference of High Pressure, Wakatsuki et al., "Synthesis of Polycrystalline Cubic BN (VI)".

"Synthesis of PolycrystallineBoron Nitride," *Material Research Bulletin*, vol. 7, pp. 999–1004 (1972).

*Primary Examiner*—Joseph Mancuso
*Assistant Examiner*—Bipin Shalwala

[57] ABSTRACT

An apparatus and method of classifying and sorting by shape crystalline objects such as synthetic diamonds in which an image of the object taken from an angle defined in relation to the object is compared to one or more templates in order to characterize the object.

30 Claims, 11 Drawing Sheets

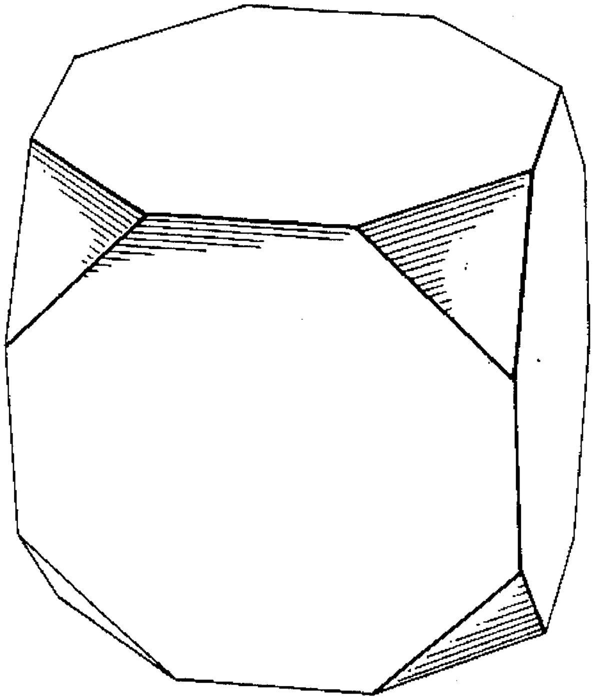
FIG. 3a
FIG. 3b
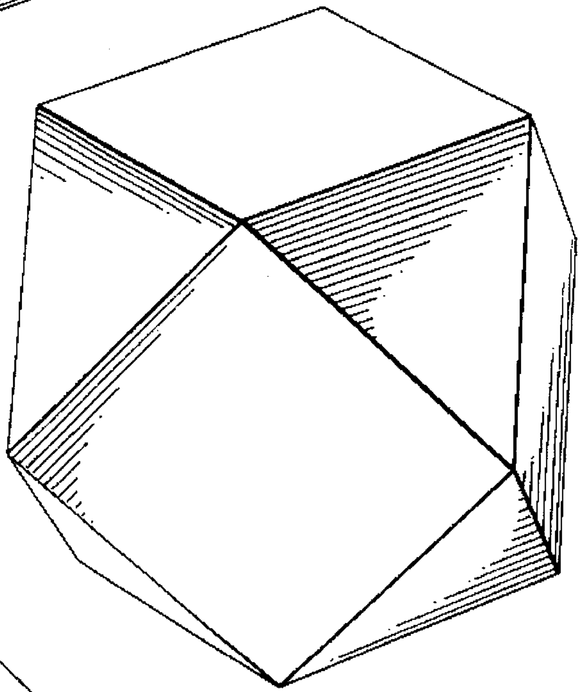
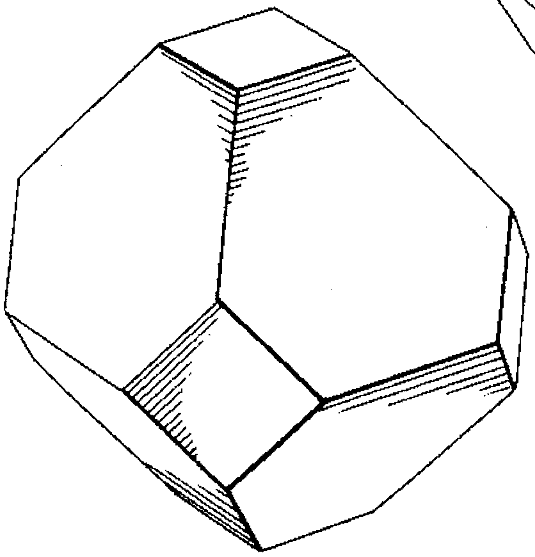
FIG. 3c

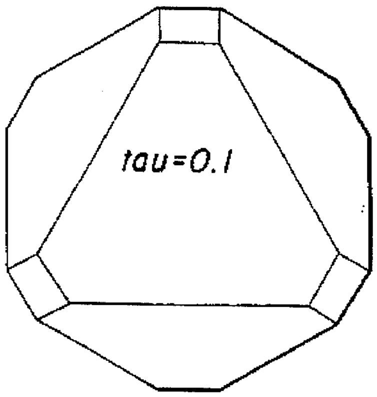
FIG. 7a
FIG. 7b
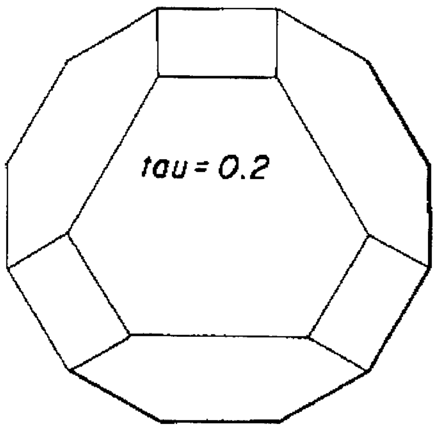
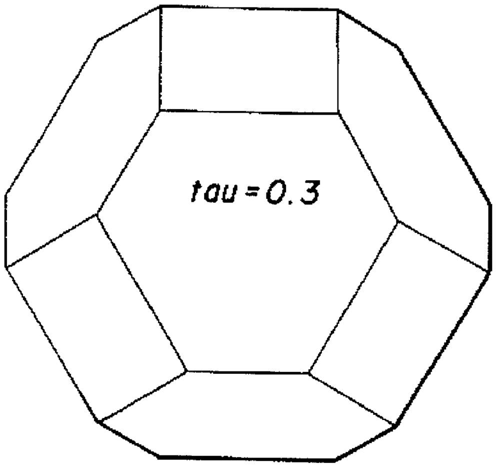
FIG. 7c
FIG. 7d
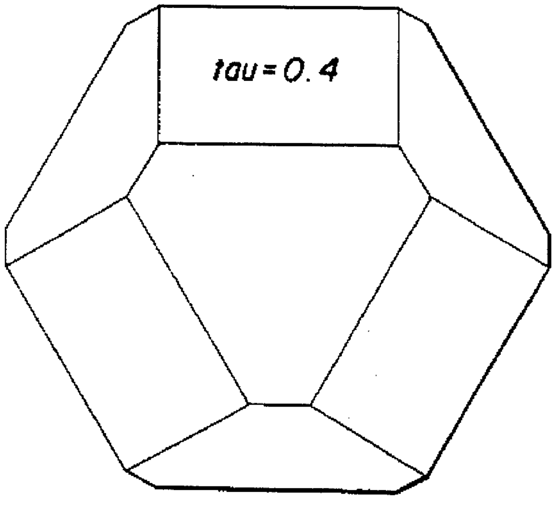

CLASSIFYING AND SORTING CRYSTALLINE OBJECTS

This is a continuation of Ser. No. 08/017,208 filed on Feb. 12, 1993 now abandoned.

BACKGROUND OF THE INVENTION

The present invention relates to an apparatus and method for reliably, precisely, and quickly classifying and sorting crystalline objects according to shape.

Synthetic diamonds are crystalline objects that are used as abrasives. The quality of industrial diamonds for use in abrasive applications is dependent on their shape. Regular diamonds, like other cubic-system crystals, take the form of cubes, octahedrons, or shapes intermediate between cubes and octahedrons. The intermediate shapes are the fourteen-faced solids which are obtained by truncating the corners of either a cube or an octahedron. In order to have optimal abrasive properties the shape of a diamond should lie midway between a cube and a octahedron.

Diamonds produced by ordinary synthetic methods exhibit a wide range of shapes. By changing the parameters of the production process the operator may exercise some control over shape in response to feedback information regarding diamonds previously produced. Because of market demand for the preferred shapes, the synthetic diamonds produced by ordinary methods are sorted by shape before they are sold. However there presently is no means for classifying and sorting synthetic diamonds which is simultaneously reliable, precise, and quick.

It is known to classify diamonds by eye into nine shape groups lettered A through I, A being an octahedron and I being a cube. Shapes C, D, and E are preferred for diamond abrasives. This method is imprecise and not practical for sorting production quantities of diamonds. For sorting of diamonds during production a shaker table is used. The shaker table separates the diamonds into eight classes designated Cup 1 to Cup 8. Cup 1 diamonds roll most easily and are the most desirable, whereas Cup 8 diamonds roll poorly and are least desirable. Cup 1 diamonds consist of a large percentage of shapes C, D, and E. However, the shaker tables are unpredictable in their operation and the same diamond will not always go into the same cup. The distribution of diamonds into the various cups is difficult to characterize and depends on peculiarities in the construction of the shaker table in a manner that is neither easily understood nor precisely reproducible.

For the foregoing reasons, there is a need for a means of reliably, precisely, and quickly classifying and sorting crystalline objects such as synthetic diamonds which can be used in both analytic and production applications.

SUMMARY OF THE INVENTION

The present invention is directed to an apparatus and method that satisfies these needs. An apparatus having features of the present invention comprises, first, an image means to create an image of the crystalline object viewed from a defined angle; second, a comparison means to compare the image to previously chosen templates; and third, an output means to display or store the results of this comparison. When the apparatus is used to sort objects, it comprises, alternately with or in addition to the output means, a sorting means to direct the classified objects to different destinations depending on their classification.

The apparatus may be used for process control. In this embodiment the apparatus comprises, alternately with or in addition to the output means or the sorting means, a feedback means for adjusting the operating parameters of a crystal synthesis process in response to the classification of crystals formed in this process.

A method according to the present invention comprises, first, creating an image of the crystalline object viewed from a defined angle; second, comparing the image to previously chosen templates; and third, displaying or storing the results of this comparison. When the method is used to sort objects, it comprises, alternately with or in addition to the displaying/storing step, directing the classified objects to different destinations depending on their classification.

The method may be used for process control. In this embodiment the method comprises, alternately with or in addition to the displaying/storing step or the sorting step, adjusting the operating parameters of a crystal synthesis process in response to the classification of crystals formed in this process.

It is an object of this invention to provide a precise system of measurement for classifying crystalline objects by shape.

It is another object of the invention to provide an apparatus and method for reliably and quickly classifying crystalline objects by shape.

It is another object of the invention to provide an apparatus and method for reliably and quickly sorting crystalline objects by shape.

It is another object of the invention to provide an apparatus and method to provide reliable feedback information for use in controlling industrial crystal formation processes.

BRIEF DESCRIPTION OF THE DRAWINGS

The above and other objects and advantages of the invention will be apparent upon consideration of the following detailed description, taken in conjunction with the accompanying drawings, in which like reference characters refer to like parts throughout, and in which.

Figure 4:
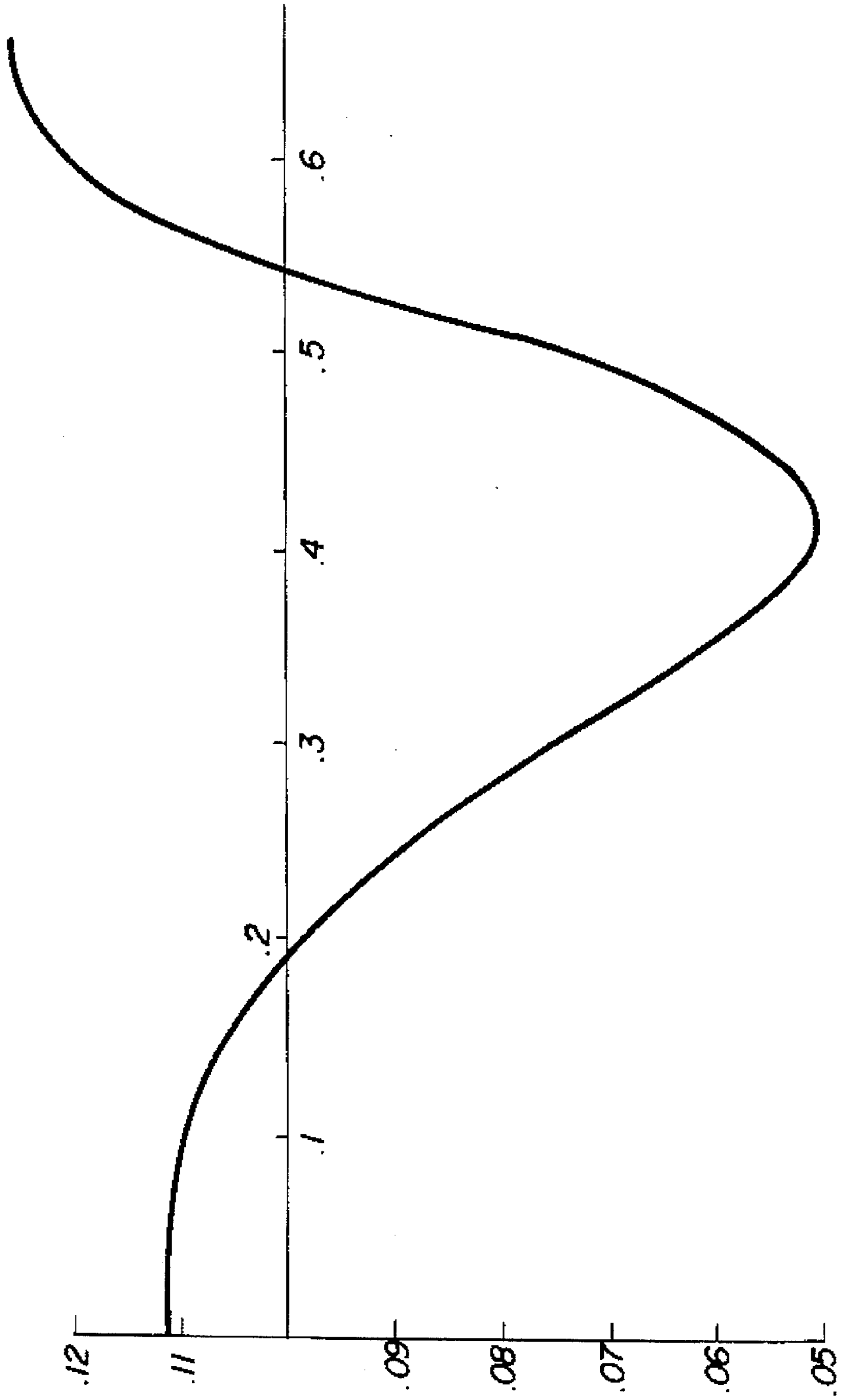
Figure 5A:
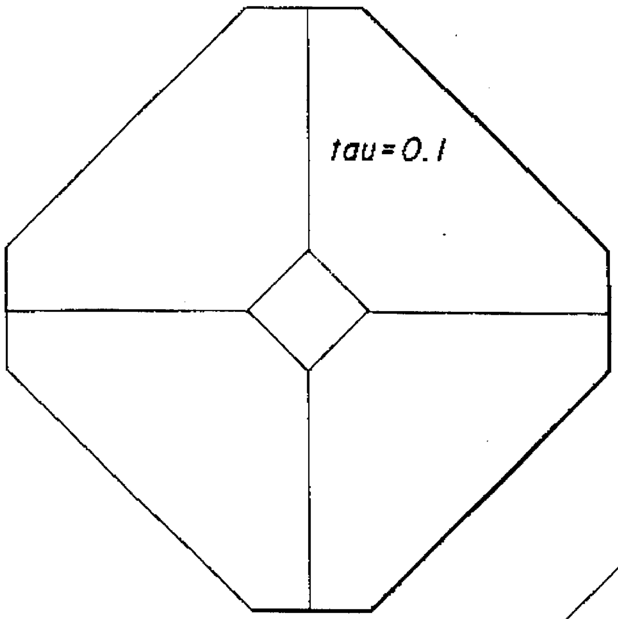
Figure 5B:
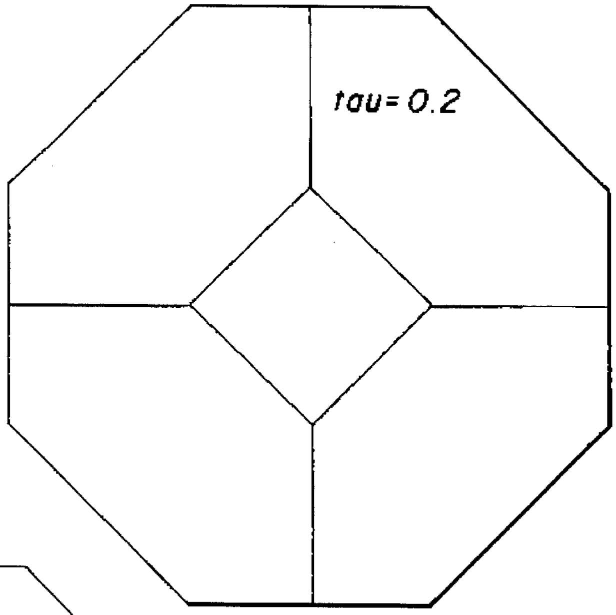
Figure 5C:
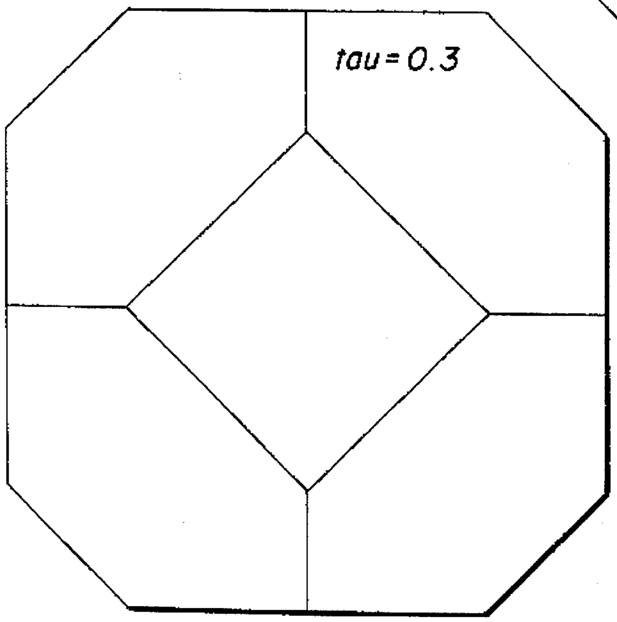
Figure 5D:
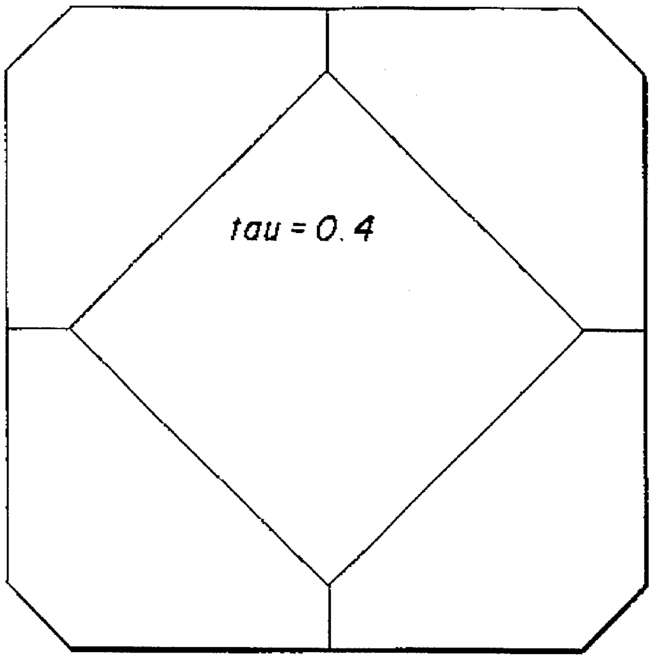
Figure 5E:
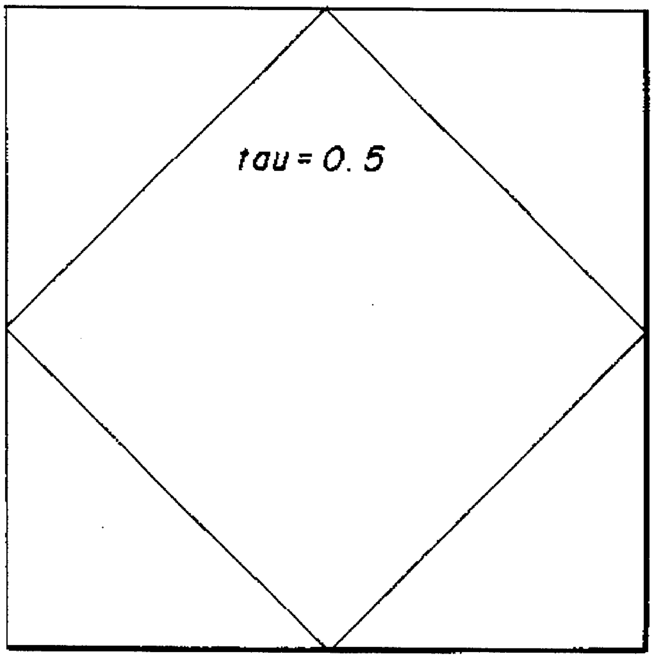
Figure 6A:
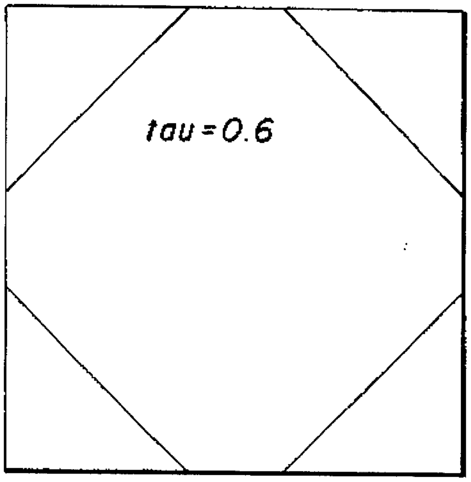
Figure 6B:
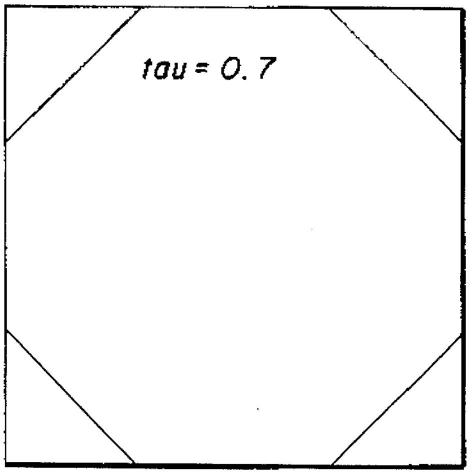
Figure 6C:
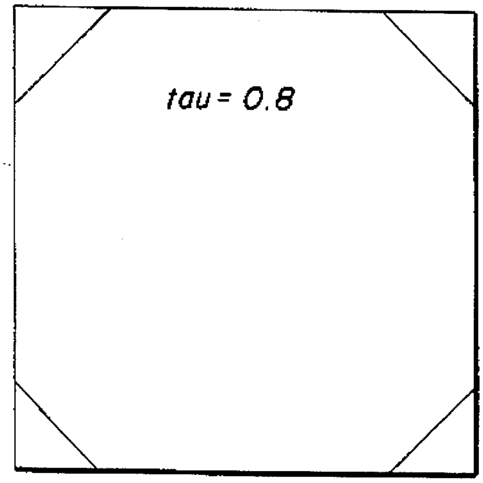
Figure 6D:
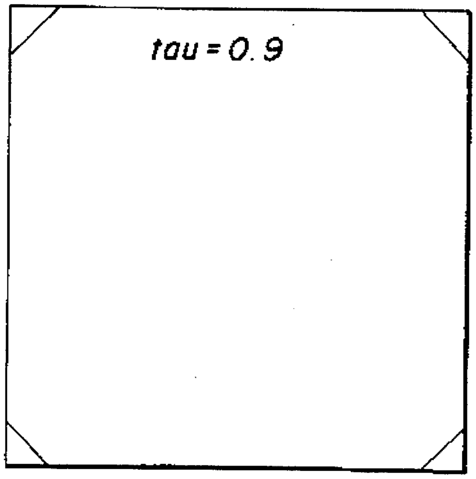
Figure 8A:
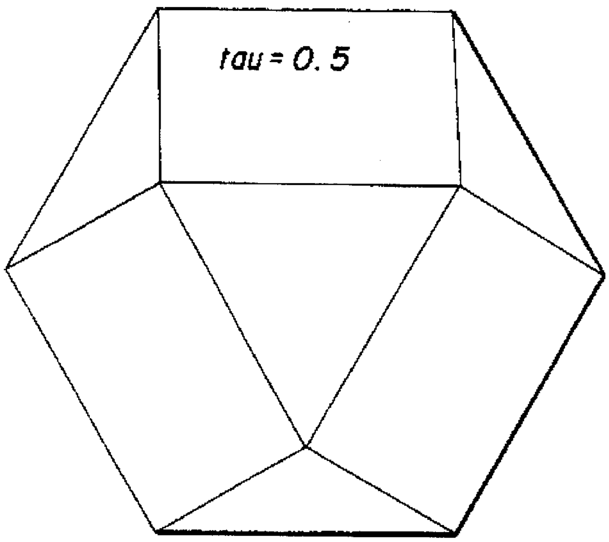
Figure 8B:
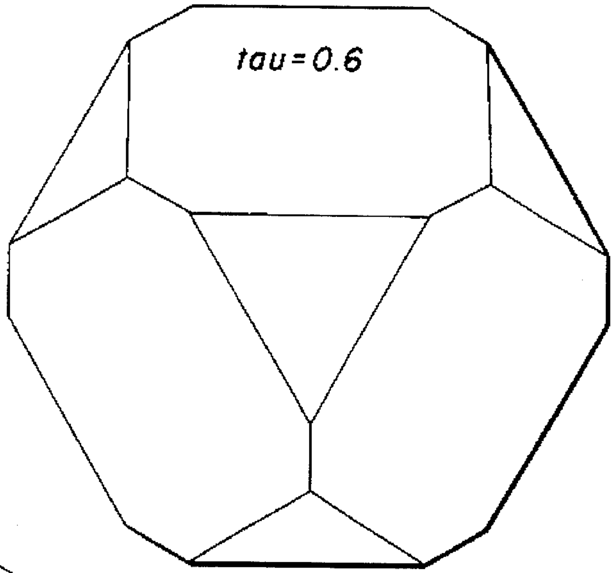
Figure 8C:
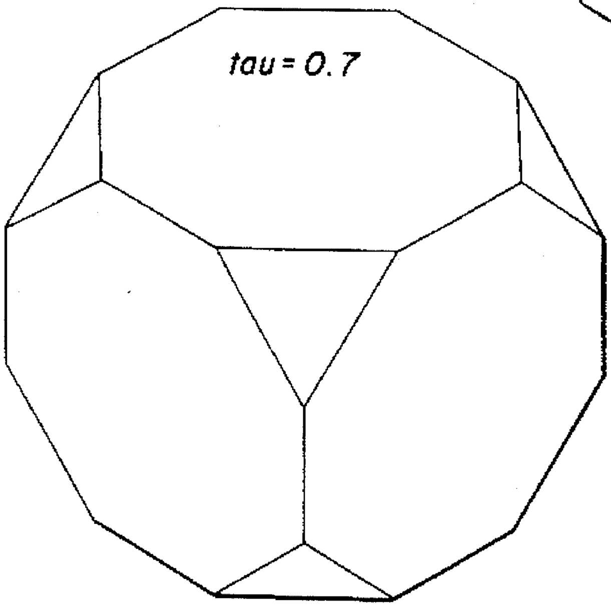
Figure 8D:
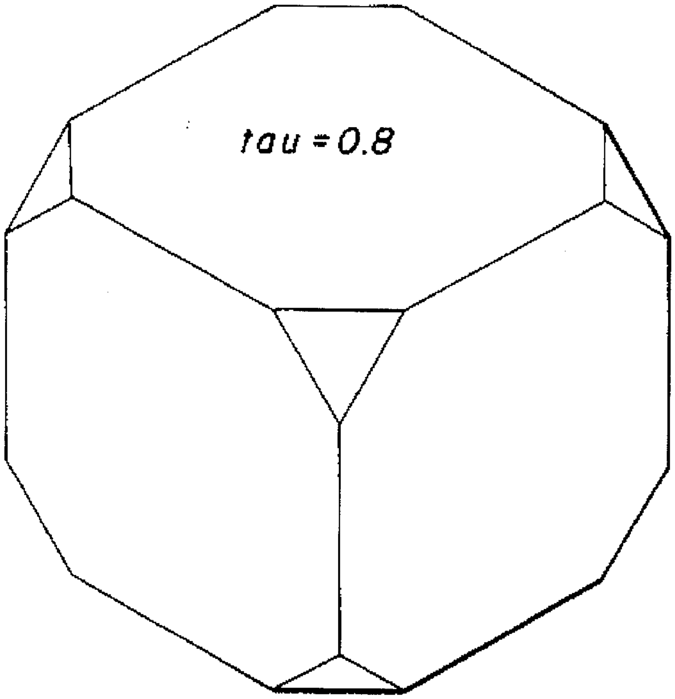
Figure 8E:
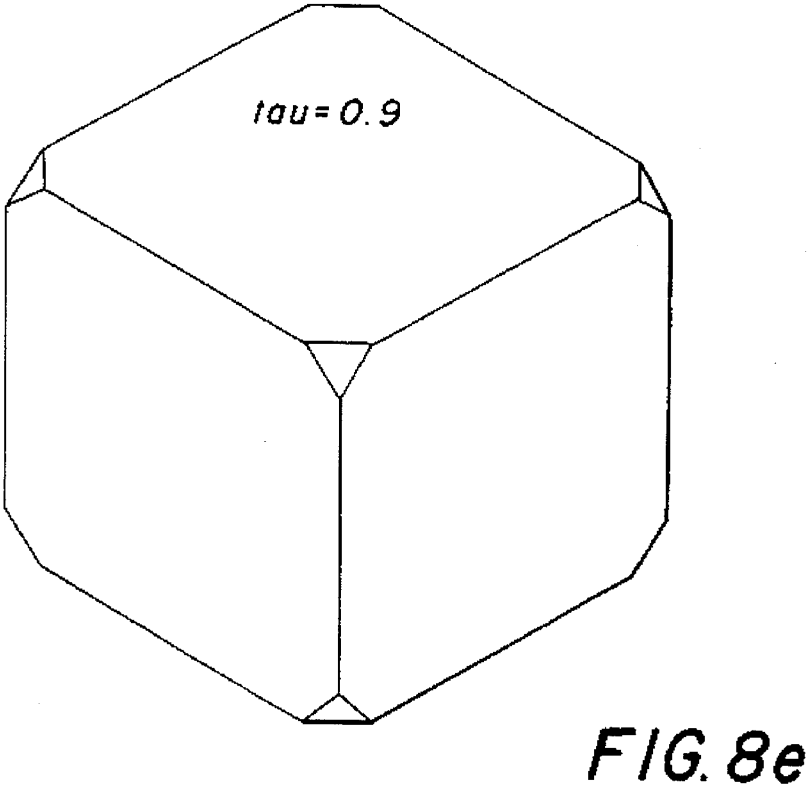

FIGS. *3a*, *3b*, and *3c* are elevations of crystals exhibiting cubic-system geometry which have $\tau$ values of 0.7, 0.5, and 0.2, respectively;

FIG. 4 is a plot of the asphericity of a cubic-system crystal as a function of $\tau$;

FIGS. *5a*, *5b*, *5c*, *5d*, and *5e* represent versions of one of the four templates used to classify cubic-system crystals, which versions differ in the value of $\tau$;

FIGS. *6a*, *6b*, *6c*, and *6d* represent versions of the second of the four templates used to classify cubic-system crystals, which versions differ in the value of $\tau$;

FIGS. *7a*, *7b*, *7c*, and *7d* represent versions of the third of the four templates used to classify cubic-system crystals, which versions differ in the value of $\tau$;

FIGS. *8a*, *8b*, *8c*, *8d*, and *8e* represent versions of the fourth of the four templates used to classify cubic-system crystals, which versions differ in the value of $\tau$;

FIGS. *9a* and *9b* are plots of the distributions of $\tau$ values repeatedly measured for given sets of diamonds in one embodiment of the invention.

DETAILED DESCRIPTION OF THE INVENTION

I. Theory of Operation

An image of a crystalline object is taken along an axis set at an angle defined relative to the object. In one embodiment, the axis must be normal to a face of the crystal object. The constraints of the defined angle and the limited geometry which the crystalline object may exhibit combine to constrain the types of images which may result. The shape of the object may then be characterized by comparison of the image to a small number of templates. The characterization may then be reduced to a mathematical description of the object. The characterization may be displayed or stored or both. Alternately or additionally objects so characterized may be sorted based on their shape. The characterization data may also be used to control a process for synthesizing the crystalline objects.

In one embodiment the crystalline object is a crystal which exhibits cubic-system structure. In another embodiment these cubic-system crystals are diamonds. Regular cubic-system crystals take the form of cubes, octahedrons, or shapes intermediate between cubes and octahedrons. The intermediate shapes are the fourteen-faced solids which are obtained by truncating the corners of either a cube or an octahedron. The shape of a cubic-system crystal can be defined by a single parameter, $\tau$. Every cubic-system crystal shape between an octahedron and a cube can be classified by a single value of $\tau$ for that shape. Unlike previous systems for classifying cubic-system crystal shape $\tau$ is a continuous parameter. Classification by the parameter $\tau$ does not require the division of an infinite number of possible shapes into a finite number of discrete categories.

The parameter $\tau$ is defined as follows. Consider a cube C with vertices at the points (+/−1, +/−1, +/−1). This cube has length 2 on each side. Now consider the plane through the points ($2\tau-1$, 1, 1), (1, $2\tau-1$, 1) and (b 1, 1, $2\tau-1$). For $\tau$ lying between 0 and 1, this plane cuts off a neighborhood of the vertex (1, 1, 1) of the cube. In fact, the plane cuts off a tetrahedron of height $(2/\sqrt{3})(1-\tau)$ from the vertex. Analogous planes are constructed to cut off the other vertices of the cube. Specifically, if $\alpha, \beta, \gamma$=+/−1, then the plane through the points ($\alpha(2\tau-1)$, $\beta$, $\gamma$), ($\alpha$, $\beta(2\tau-1)$, $\gamma$), and ($\alpha$, $\beta$, $\gamma(2\tau-1)$), cuts off a neighborhood of the vertex ($\alpha, \beta, \gamma$). The polyhedron that remains after each of the vertices has been truncated by such a plane is a cube-octahedron, denoted $C_\tau$. It may be seen that for $\tau$=1, $C_\tau$ is the original cube C, since the truncating planes do not meet the cube except at the vertices. On the other hand, for $\tau$=0, the remaining polyhedron is an octahedron with one vertex at the center of each of the faces of the original cube. FIG. 3*a* shows the polyhedron $C_\tau$ for a value $\tau$=0.7. for $\tau$=0.5 the polyhedron $C_\tau$ has a special shape half way between a cube and an octahedron, shown in FIG. 3*b*. For $\tau<0.5$, the truncating planes meet each other and the truncated regions around each vertex overlap, resulting in a shape such as shown in FIG. 3*c*, for which $\tau$=0.2.

The $\tau$ parameter can be related to the asphericity of a diamond crystal. Asphericity may be defined as the standard deviation of the radius of a polyhedron, integrated over all 3-dimensional radial directions, divided by the mean radius. For a perfect sphere this value is 0. FIG. 4 is a graph of asphericity plotted against $\tau$. The synthetic diamonds that are most valuable as abrasives preferably have a value of $\tau$ between about 0.2 and about 0.5. FIG. 4 demonstrates that such diamonds have low asphericity.

In a preferred embodiment a translucent cubic-system regular crystal is backlit so that it presents an image of a dark silhouette with a lighter inner area that represents the outline of the upper face of the crystal. One of four templates corresponds to every possible image such an arrangement can present. The templates in this embodiment are comprised of two polygons. One polygon, the "inner outline," corresponds to the upper face of the crystal. The second, the "outer outline," corresponds to the silhouette of the crystal. The choice of template depends on whether the crystal is lying on its cubic face or its octahedral face and whether it has $\tau>0.5$ or $\tau<0.5$. The four templates are thus:

| | Normal Face | $\tau$ | Inner Outline | Outer Outline |
|---|---|---|---|---|
| 1 | Cubic | <0.5 | Square | Octagon |
| 2 | Cubic | >0.5 | Octagon | Square |
| 3 | Octahedral | <0.5 | Hexagon | Dodecagon |
| 4 | Octahedral | >0.5 | Triangle | Dodecagon |

FIGS. 5, 6, 7, and 8 are versions of these four templates for various values of $\tau$. However, the fourth template may be omitted because of the unlikeliness that such a crystal will come to rest on its triangular face rather than its octagonal face.

The templates are defined mathematically in relation to $\tau$. The vertices of template 1 are defined as: inner outline, (0, $2\tau$), ($2\tau$, 0), (0, $-2\tau$), ($-2\tau$, 0); outer outline ($-2\tau$, 1), ($2\tau$, 1), (1, $2\tau$), (1, $-2\tau$), ($2\tau$, −1), ($-2\tau$, −1), (−1, $-2\tau$), (−1, $2\tau$). The vertices of template 2 are defined as: inner outline, ($1-2\tau$, 1), ($2\tau-1$, 1), (1, $2\tau-1$), (1, $1-2\tau$), ($2\tau-1$, −1), ($1-2\tau$, −1), (−1, $1-2\tau$), (−1, $2\tau-1$); outer outline, (−1, 1), (1, 1), (1, −1), (−1, −1). For template 3, the vertices are defined in polar coordinates. The outer outline has vertices at (R, g+/−$\theta$), where g takes the values 0°, 60°, 120°, 180°, 240°, and 300°, and R and $\theta$ are defined:

$$R=\sqrt{(2\tau^2+(2/3)(1+\tau)^2)}$$

$$\theta=\tan^{-1}(\sqrt{3}\tau/(1+\tau))$$

The inner outline has vertices at (r, h+/−$\phi$), where h takes the values 0°, 120°, and 240°, and r and $\phi$ are defined:

$$r=\sqrt{(((1+2\tau)^2/6)+((1-2\tau)^2/3))}$$

$$\theta=\tan^{-1}((\sqrt{3}(1-2\tau))/(1+2\tau))$$

Template 4 is omitted but could be defined mathematically in a similar fashion.

II. Description of Preferred Embodiments

Figure 1:
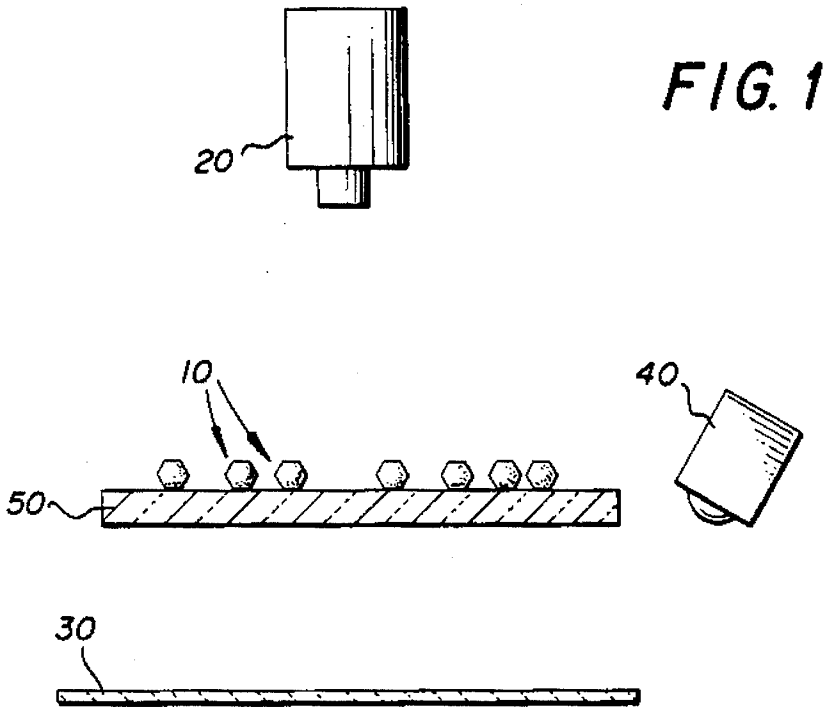
FIG. 1 is a schematic depiction of an apparatus which may be used to classify crystalline objects in accordance with the present invention.

In a preferred embodiment of the invention the image means is a video camera positioned above a flat surface and aligned with its viewing axis normal to the surface. FIG. 1 depicts an example of such an apparatus. Either a color or a black and white camera 20 may be used. Since the crystal(s) 10 must lie flat with one of its faces on the surface 50 and the viewing axis of the camera is normal to the surface 50, the camera must "see" an image of the crystal 10 that is taken perpendicular to one of the faces of the crystal 10. The combination of the flat surface 50 and the camera angle (i.e. the angle between the viewing axis and the surface) limit the orientation which the crystal can take in relation to the image which is created.

In a preferred embodiment the crystal lies on a transparent or translucent surface 50 and is backlit by diffuse light from a light source 40 reflected off a diffusing reflector 30. A translucent crystal may then exhibit an outer outline and an inner outline, the outer outline being the silhouette of the crystal and the inner outline corresponding to the face of the crystal facing the camera. Because they are oblique to the camera the other edges are not distinctly visible. Any lighting arrangement which simplifies the selection of templates may be used. Alternately the crystalline objects may be caused to fluoresce and an image of the pattern of fluorescence taken. Alternately the crystalline objects may be imaged using x-ray, ultraviolet, or other forms of radiation.

In a preferred embodiment, the object is a cubic-system crystal. In another embodiment that cubic-system crystal is a diamond. A regular cubic-system crystal must lie on a flat surface in one of two ways: on an octahedral face or on a cubic face. Because the orientation of the crystal is limited, the image created can be classified by comparison to a limited number of templates. In the case of a cubic-system crystal, one of three templates will be a match to practically every regular shape the crystal can take.

In a preferred embodiment of the invention the comparison means is a computer. The computer converts the image into a digital signal and then mathematically compares the digitized image to one or more templates. The templates are moved, rotated, enlarged, and geometric parameters of the templates are altered until a sufficiently good fit is found between the image and the template.

When the comparison means is a computer, the image may be digitized by known methods. Where color segmentation is used, it is preferred to give a greater weight to colors which increase contrast. This choice depends on the color of the crystalline object. When the objects are diamonds, which tend to be yellow in color, it is advantageous to emphasize the blue signal by giving it twice the weight of the red and green signals. An alternative technique is based on color quantization. In applying this technique to diamond classification, the reference colors do not need to be chosen for each image, but are computed in advance using a representative sample of diamond images. In addition the segmentation of the quantized image may be done in advance. This task consists of specifying which of the reference colors belongs to each segmentation region.

When the comparison means is a computer, a plurality of crystalline objects are present in the image means, and the objects are not physically separated, the computer must resolve the image into separate objects before comparing the object images to templates. This may be done by use of morphological operators. A cluster of diamonds is eroded until they shrink to individual vanishing points, one at the center of each diamond. A morphological dilation operator is then applied to the resulting "seeds" and the individual objects are then regrown. This separates the cluster into individual objects.

When the comparison means is a computer, the outlines of the image may be defined by thresholding techniques, edge detection techniques, gradient techniques, or other techniques known in the art. The thresholding technique detects differences in brightness between the object and the background. The object can be separated from the background by comparing image intensities with a predefined threshold. The outer boundary of the object is taken as the outer boundary of the region which does not exceed the threshold. The thresholding technique is used to detect the outer boundary of the object in the preferred embodiment. Alternately, edge detection techniques might be used. Gradient techniques may also be used. The gradient technique is used to detect the inner outline of the object in the preferred embodiment because it is more poorly defined. The intensity gradient is calculated at points inside the outer edge of the object. At each pixel the intensity gradient is represented by a vector pointing in the direction of maximum intensity increase with magnitude equal to the rate of intensity increase at that pixel. A pixel is deemed to be on a boundary if the gradient points toward the center of the object. It is given weight in the boundary proportional to the magnitude of the gradient.

When the comparison means is a computer, the templates may be fit to the image by a method known as parameter fitting. One popular method of parameter fitting is the Levenberg-Marquardt method. In the preferred embodiment a parameterization of a template consists of five parameters: the shape parameter $\tau$, the two coordinates of the center of the template, the rotation of the template, and the size of the template. In this embodiment the evaluation function for goodness of fit is: $\Sigma_x w_x d(x,T)^2$ where $d(x,T)$ is the distance between a boundary point x in the image belonging to the inner or outer outline of the image and the respective inner or outer outline of the template T. The $w_x$ is a weight representing the strength of the edge pixel x, and the sum runs over all pixels in the relevant outlines of the imaged diamond. For purposes of speed, it is possible to sum over a sample of the boundary pixels only. The initial values for the Levenberg-Marquardt iteration are preferably such that the centroid of the template is placed at the centroid of the image, the radii of the image and the template match and the orientation and shape parameter are arbitrarily chosen. For best results, the Levenberg-Marquardt iteration is run several times with different initial values for orientation and shape.

When a sufficiently good fit is established between template and image, the $\tau$ value is displayed or stored or both. The computer may alternately or additionally cause the sorting means to send the crystal to an appropriate destination or cause an alteration in the operating parameters of a crystal production process.

Other parameters may be calculated from the matched template or directly from the image. Such parameters may include but are not limited to the area/perimeter-squared ratio of the object, the eccentricity of the object, the clarity of the object, or the asphericity of the object.

It should be apparent that this method and apparatus can be adapted to crystals other than cubic-system crystals by the selection of the appropriate templates. One or more geometric parameters may be used to describe the crystalline object, depending on the templates chosen.

The output means preferably comprises a video screen, a printer, or any other means for making the results comprehensible to persons, as well as means which may store information for later retrieval.

Figure 2:
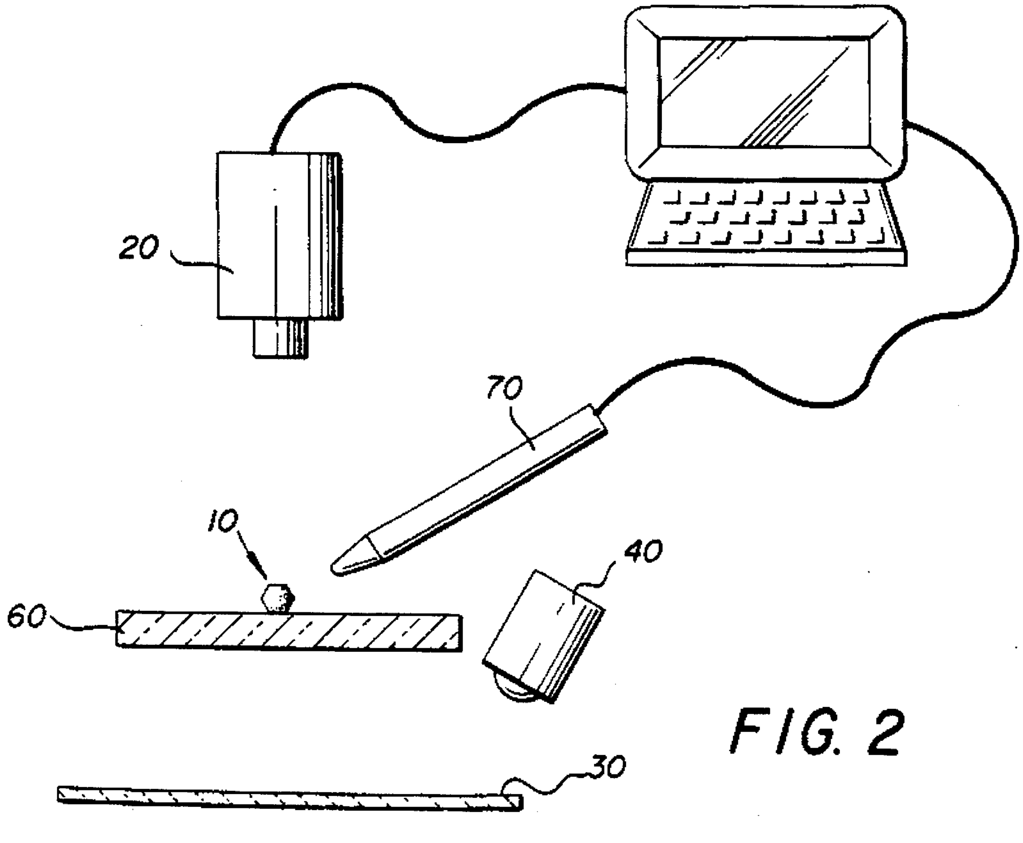
FIG. 2 is a schematic depiction of an apparatus which may be used to sort crystalline objects in accordance with the present invention.

The sorting means may include any means capable of impelling the crystalline objects in a directed manner. One possible sorting means is represented in FIG. 2. This embodiment comprises a combination of a transparent conveyor belt 60 and one or more air jets 70 to impel the selected objects from the conveyor into a bin, a chute, or another conveyor system.

Where the objects are carried on a conveyor belt a strobe light triggered by a position sensor may be desireable as a light source to obtain a sharp image of the object. Alternately a linear array of sensors may be used which capture a linear image, the second dimension of the image being supplied by the motion of the belt.

The following example is illustrative:

EXAMPLE

Samples of about 60 synthetic diamonds were placed on a transparent plate. A white reflective surface was positioned under the plate and brightly lit so as to backlight the diamonds. An image of the diamonds was captured by a video camera placed directly above the transparent plate. The image signal from the camera was digitized and fit to cubic-system templates in accordance with the preferred embodiment. Each diamond was assigned a $\tau$ value and the distribution of $\tau$ values was plotted on a chart.

Figure 9A:
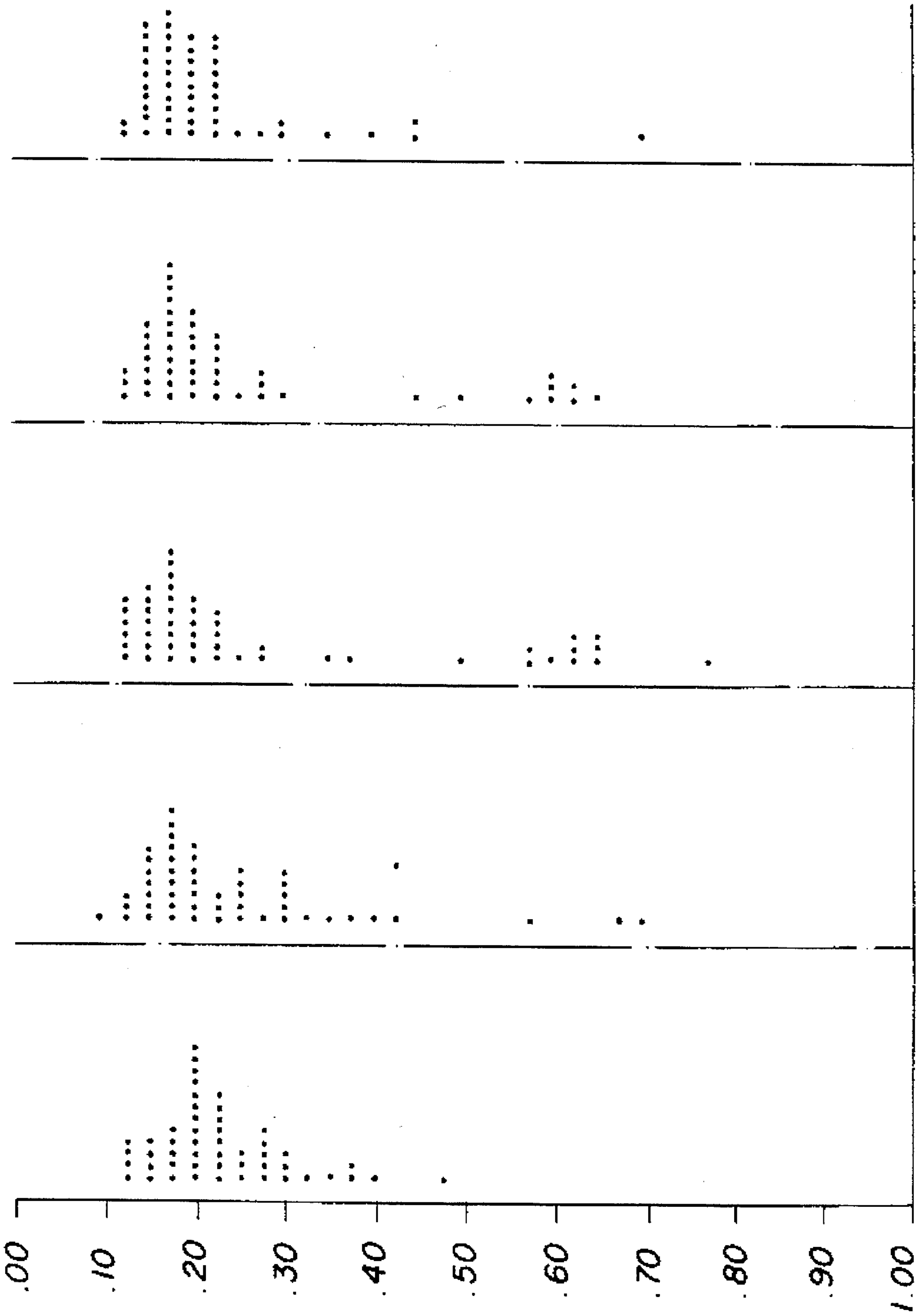
Figure 9B:
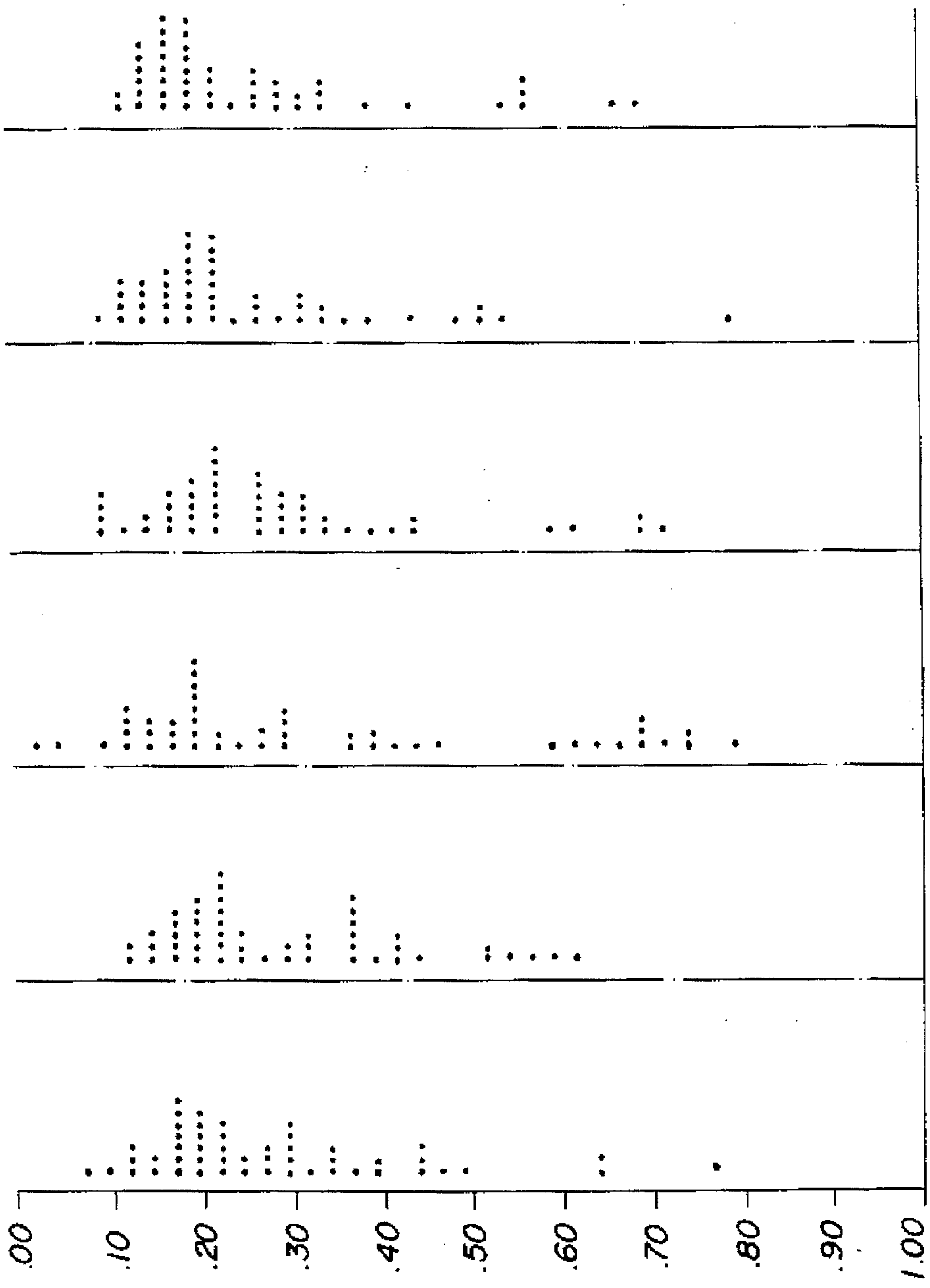

FIGS. 9*a* and 9*b* represent the distributions of $\tau$ values for samples of Cup 1 and Cup 3 diamonds obtained in repeated trials. The diamonds were shaken and redistributed on the plate between trials. The agreement between trials is very good. Conversely, the results for the Cup 1 and Cup 3 samples show that the shaker table system does not separate the diamonds efficiently. The Cup 3 sample contains many diamonds which could be classified as Cup 1 diamonds and thereby used to greater advantage.

Thus it is seen that an apparatus and method for reliably, precisely, and quickly classifying and sorting crystalline objects according to shape is provided. One skilled in the art will appreciate that the present invention can be practiced by other than the preferred embodiments which are presented for purposes of illustration and not of limitation, and the present invention is limited only by the claims which follow.

What is claimed is:

1. Apparatus for sorting crystalline objects, said apparatus comprising:

image means for creating an image of a crystalline object viewed from a defined angle, said image comprising a set of polygonal outlines including a first polygonal outline corresponding to the representation of the silhouette of said crystalline object in said image and a second polygonal outline corresponding to the representation of the shape of a crystalline face of said crystalline object in said image;

comparison means for comparing said set of polygonal outlines of said image to (a) at least one template derived from a set of reference polygons including a first reference polygon corresponding to a silhouette of a reference crystal and a second reference polygon corresponding to the shape of a crystalline face of said reference crystal within said silhouette, wherein said template can be varied in position, size, and shape by changing the values of at least one parameter, and (b) at least one set of parameter values for said at least one template, for varying the position, size, and shape of said at least one template by changing the values of said at least one parameter, and for selecting at least one combination of a template and a set of parameter values corresponding to said image;

output means for indicating at least one parameter value selected by said comparison means; and sorting means for sorting the crystalline object to one of a plurality of destinations dependent upon at least one parameter value selected by said comparison means.

2. The apparatus of claim 1 wherein the crystalline object is a cubic-system crystal.

3. The apparatus of claim 1 wherein the crystalline object is a diamond.

4. Apparatus for sorting crystalline objects, said apparatus comprising:

image means for creating an image of a crystalline object viewed from a defined angle, said image comprising a set of polygonal outlines including a first polygonal outline corresponding to the representation of the silhouette of said crystalline object in said image and a second polygonal outline corresponding to the representation of the shape of a crystalline face of said crystalline object in said image;

comparison means for comparing said set of polygonal outlines of said image to (a) at least one template derived from a set of reference polygons including a first reference polygon corresponding to a silhouette of a reference crystal and a second reference polygon corresponding to the shape of a crystalline face of said reference crystal within said silhouette, wherein said template can be varied in position, size, and shape by changing the values of at least one parameter, and (b) at least one set of parameter values for said at least one template; varying the position, size, and shape of said at least one template by changing the values of said at least one parameter; and selecting at least one combination of a template and a set of parameter values corresponding to said image;

sorting means for sorting the crystalline object to one of a plurality of destinations dependent upon at least one parameter value selected by said comparison means.

5. The apparatus of claim 4 wherein the crystalline object is a cubic-system crystal.

6. The apparatus of claim 4 wherein the crystalline object is a diamond.

7. Method of sorting crystalline objects, said method comprising:

creating an image of a crystalline object viewed from a defined angle, said image comprising a set of polygonal outlines including a first polygonal outline corresponding to the representation of the silhouette of said crystalline object in said image and a second polygonal outline corresponding to the representation of the shape of a crystalline face of said crystalline object in said image;

comparing said set of polygonal outlines of said image to (a) at least one template derived from a set of reference polygons including a first reference polygon corresponding to a silhouette of a reference crystal and a second reference polygon corresponding to the shape of a crystalline face of said reference crystal within said silhouette, wherein said at least one template can be varied in position, size, and shape by changing the values of at least one parameter, and (b) at least one set of parameter values for said at least one template;

varying the position, size, and shape of said at least one template by changing the values of said at least one parameter;

selecting at least one combination of a template and a set of parameter values corresponding to said image;

indicating at least one selected parameter value; and sorting the crystalline object to one of a plurality of destinations dependent upon at least one parameter value selected by said comparison means.

8. The method of claim 7 wherein the crystalline object is a cubic-system crystal.

9. The method of claim 7 wherein the crystalline object is a diamond.

10. Method of sorting crystalline objects, said method comprising:

creating an image of a crystalline object viewed from a defined angle, said image comprising a set of polygonal outlines including a first polygonal outline corresponding to the representation of the silhouette of said crystalline object in said image and a second polygonal outline corresponding to the representation of the shape of a crystalline face of said crystalline object in said image;

comparing said set of polygonal outlines of said image to (a) at least one template derived from a set of reference polygons including a first reference polygon corresponding to a silhouette of a reference crystal and a second reference polygon corresponding to the shape of a crystalline face of said reference crystal within said silhouette, wherein said at least one template can be varied in position, size, and shape by changing the values of at least one parameter, and (b) at least one set of parameter values for said at least one template;

varying the position, size, and shape of said at least one template by changing the values of said at least one parameter;

selecting at least one combination of a template and a set of parameter values corresponding to said image; and sorting the crystalline object to one of a plurality of destinations dependent upon at least one selected parameter value.

11. The method of claim 10 wherein the crystalline object is a cubic-system crystal.

12. The method of claim 10 wherein the crystalline object is a diamond.

13. The apparatus of claim 1 wherein the image means comprises:

a clear plate for supporting said crystalline objects;

a reflective surface positioned below said plate;

a light source for illuminating said reflective surface;

a video camera positioned with its viewing axis normal to said plate.

14. The apparatus of claim 13 wherein said comparison means is a computer.

15. The apparatus of claim 14 wherein said crystalline object is a cubic-system crystal, said parameters comprise a shape parameter $\tau$, and said templates each comprise an inner outline and an outer outline which are defined by specifying a set of vertices for each outline as follows:

the vertices of the inner outline of a first template are defined as: $(0, 2\tau)$, $(2\tau, 0)$, $(0, -2\tau)$, $(-2\tau, 0)$;

the vertices of the outer outline of said first template are defined as: $(-2\tau, 1)$, $(2\tau, 1)$, $(1, 2\tau)$, $(1, -2\tau)$, $(2\tau, -1)$, $(-2\tau, -1)$, $(-1, -2\tau)$, $(-1, 2\tau)$;

the vertices of the inner outline of a second template are defined as: $(1-2\tau, 1)$, $(2\tau-1, 1)$, $(1, 2\tau-1)$, $(1, 1-2\tau)$, $(2\tau-1, -1)$, $(1-2\tau, -1)$, $(-1, 1-2\tau)$, $(-1, 2\tau-1)$;

the vertices of the outer outline of said second template are defined as: $(-1, 1)$, $(1, 1)$, $(1, -1)$, $(-1, -1)$;

the vertices of the outer outline of a third template are defined in polar coordinates as: $(R, g\pm\Theta)$, where g takes the values 0°, 60°, 120°, 180°, 240°, and 300°, and R and $\Theta$ are defined: $R=\sqrt{(2\tau^2+(2/3)(1+\tau)^2)}$, $\Theta=\tan^{-1}(\sqrt{3}\tau/(1+\tau))$;

the vertices of the inner outline of said third template are defined in polar coordinates as: $(r, h\pm\phi)$, where h takes the values 0°, 120°, and 240°, and r and $\phi$ are defined: $r=\sqrt{(((1+2\tau)^2/6)+((1-2\tau)^2/3))}$, $\phi=\tan^{-1}((\sqrt{3}(1-2\tau))/(1+2\tau))$.

16. The apparatus of claim 15 wherein said cubic-system crystal is a diamond.

17. The apparatus of claim 4 wherein the image means comprises:

a clear plate for supporting said crystalline objects;

a reflective surface positioned below said plate;

a light source for illuminating said reflective surface;

a video camera positioned with its viewing axis normal to said plate.

18. The apparatus of claim 17 wherein said comparison means is a computer.

19. The apparatus of claim 18 wherein said crystalline object is a cubic-system crystal, said parameters comprise a shape parameter $\tau$, and said templates each comprise an inner outline and an outer outline which are defined by specifying a set of vertices for each outline as follows:

the vertices of the inner outline of a first template are defined as: $(0, 2\tau)$, $(2\tau, 0)$, $(0, -2\tau)$, $(-2\tau, 0)$;

the vertices of the outer outline of said first template are defined as: $(-2\tau, 1)$, $(2\tau, 1)$, $(1, 2\tau)$, $(1, -2\tau)$, $(2\tau, -1)$, $(-2\tau, -1)$, $(-1, -2\tau)$, $(-1, 2\tau)$;

the vertices of the inner outline of a second template are defined as: $(1-2\tau, 1)$, $(2\tau-1, 1)$, $(1, 2\tau-1)$, $(1, 1-2\tau)$, $(2\tau-1, -1)$, $(1-2\tau, -1)$, $(-1, 1-2\tau)$, $(-1, 2\tau-1)$;

the vertices of the outer outline of said second template are defined as: $(-1, 1)$, $(1, 1)$, $(1, -1)$, $(-1, -1)$;

the vertices of the outer outline of a third template are defined in polar coordinates as: $(R, g\pm\Theta)$, where g takes the values 0°, 60°, 120°, 180°, 240°, and 300°, and R and $\Theta$ are defined: $R=\sqrt{(2\tau^2+(2/3)(1+\tau)^2)}$, $\Theta=\tan^{-1}(\sqrt{3}\tau/(1+\tau))$;

the vertices of the inner outline of said third template are defined in polar coordinates as: $(r, h\pm\phi)$, where h takes the values 0°, 120°, and 240°, and r and $\phi$ are defined: $r=\sqrt{(((1+2\tau)^2/6)+((1-2\tau)^2/3))}$, $\phi=\tan^{-1}((\sqrt{3}(1-2\tau))/(1+2\tau))$.

20. The apparatus of claim 19 wherein said cubic-system crystal is a diamond.

21. The method of claim 7 wherein the step of creating an image comprises:

disposing said crystalline objects on a clear plate positioned above a reflective surface, said reflective surface being illuminated by a light source;

imaging said crystalline objects by means of a video camera positioned with its viewing axis normal to said plate.

22. The method of claim 21 wherein said comparing step and said selecting step are performed by means of a computer.

23. The method of claim 22 wherein said crystalline object is a cubic-system crystal, said parameters comprise a shape parameter $\tau$, and said templates each comprise an inner outline and an outer outline which are defined by specifying a set of vertices for each outline as follows:

the vertices of the inner outline of a first template are defined as: $(0, 2\tau)$, $(2\tau, 0)$, $(0, -2\tau)$, $(-2\tau, 0)$;

the vertices of the outer outline of said first template are defined as: $(-2\tau, 1)$, $(2\tau, 1)$, $(1, 2\tau)$, $(1, -2\tau)$, $(2\tau, -1)$, $(-2\tau, -1)$, $(-1, -2\tau)$, $(-1, 2\tau)$;

the vertices of the inner outline of a second template are defined as: $(1-2\tau, 1)$, $(2\tau-1, 1)$, $(1, 2\tau-1)$, $(1, 1-2\tau)$, $(2\tau-1, -1)$, $(1-2\tau, -1)$, $(-1, 1-2\tau)$, $(-1, 2\tau-1)$;

the vertices of the outer outline of said second template are defined as: $(-1, 1)$, $(1, 1)$, $(1, -1)$, $(-1, -1)$;

the vertices of the outer outline of a third template are defined in polar coordinates as: $(R, g\pm\Theta)$, where g takes the values 0°, 60°, 120°, 180°, 240°, and 300°, and R and $\Theta$ are defined: $R=\sqrt{(2\tau^2+(2/3)(1+\tau)^2)}$, $\Theta=\tan^{-1}(\sqrt{3}\tau/(1+\tau))$;

the vertices of the inner outline of said third template are defined in polar coordinates as: (r, h±φ), where h takes the values 0°, 120°, and 240°, and r and φ are defined: $r=\sqrt{(((1+2\tau)^2/6)+((1-2\tau)^2/3))}$, $\phi=\tan^{-1}((\sqrt{3}(1-2\tau))/(1+2\tau))$.

24. The apparatus of claim 23 wherein said cubic-system crystal is a diamond.

25. The method of claim 10 wherein the step of creating an image comprises:

disposing said crystalline objects on a clear plate positioned above a reflective surface, said reflective surface being illuminated by a light source;

imaging said crystalline objects by means of a video camera positioned with its viewing axis normal to said plate.

26. The method of claim 25 wherein said comparing step and said selecting step are performed by means of a computer.

27. The method of claim 26 wherein said crystalline object is a cubic-system crystal, said parameters comprise a shape parameter τ, and said templates each comprise an inner outline and an outer outline which are defined by specifying a set of vertices for each outline as follows:

the vertices of the inner outline of a first template are defined as: (0, 2τ), (2τ, 0), (0, −2τ), (−2τ, 0);

the vertices of the outer outline of said first template are defined as: (−2τ, 1), (2τ, 1), (1, 2τ), (1, −2τ), (2τ, −1), (−2τ, −1), (−1, −2τ), (−1, 2τ);

the vertices of the inner outline of a second template are defined as: (1−2τ, 1), (2τ−1, 1), (1, 2τ−1), (1, 1−2τ), (2τ−1, −1), (1−2τ, −1), (−1, 1−2τ), (−1, 2τ−1);

the vertices of the outer outline of said second template are defined as: (−1, 1), (1, 1), (1, −1), (−1, −1);

the vertices of the outer outline of a third template are defined in polar coordinates as: (R, g±θ), where g takes the values 0°, 60°, 120°, 180°, 240°, and 300°, and R and Θ are defined: $R=\sqrt{(2\tau^2+(2/3)(1+\tau)^2)}$, $\Theta=\tan^{-1}(\sqrt{3}\tau/(1+\tau))$;

the vertices of the inner outline of said third template are defined in polar coordinates as: (r, h±φ), where h takes the values 0°, 120°, and 240°, and r and φ are defined: $r=\sqrt{(((1+2\tau)^2/6)+((1-2\tau)^2/3))}$, $\phi=\tan^{-1}((\sqrt{3}(1-2\tau))/(1+2\tau))$.

28. The apparatus of claim 27 wherein said cubic-system crystal is a diamond.

29. Apparatus for sorting crystalline objects, said apparatus comprising:

image means for creating an image of a crystalline object viewed from a defined angle, said image comprising a set of polygonal outlines including a first polygonal outline corresponding to the representation of the silhouette of said crystalline object in said image and a second polygonal outline corresponding to the representation of the shape of a crystalline face of said crystalline object in said image;

a plurality of sets of reference polygons, each set corresponding to one of a plurality of possible degrees of asphericity for said crystalline object, and each set including a first reference polygon and a second reference polygon;

means for varying the positions, sizes, and shapes of the reference polygons of each of said sets, such that the degree of asphericity of said crystalline object may be determined by comparing said set of polygonal outlines of said image to said sets of reference polygons until a close match to both of said first and second polygonal outlines is found in a single set;

means for sorting said crystalline object to one of a plurality of destinations dependent upon the degree of asphericity of said single set of reference polygons.

30. A method for sorting crystalline objects, said method comprising:

creating an image of a crystalline object viewed from a defined angle, said image comprising a set of polygonal outlines including a first polygonal outline corresponding to the representation of the silhouette of said crystalline object in said image and a second polygonal outline corresponding to the representation of the shape of a crystalline face of said crystalline object in said image;

determining the degree of asphericity of said crystalline object by comparing said set of polygonal outlines of said image to a plurality of sets of reference polygons, each set corresponding to one of a plurality of possible degrees of asphericity for said crystalline object and each set including a first reference polygon and a second reference polygon, and varying the position, size, and shape of each of said sets of reference polygons until a close match to both of said first and second polygonal outlines is found in a single set; and sorting said crystalline object to one of a plurality of destinations dependent upon the degree of asphericity of said single set of reference polygons.

* * * * *